United States Patent [19]

Hazen et al.

[11] 3,922,247

[45] Nov. 25, 1975

[54] HANDLEABLE, MOLDABLE ESTER-TYPE RESIN COMPOSITIONS

[75] Inventors: Stanley M. Hazen, Cheswick; William J. Heilman, Allison Park, both of Pa.

[73] Assignee: Gulf Research & Development Company, Pittsburgh, Pa.

[22] Filed: June 15, 1973

[21] Appl. No.: 370,365

[52] U.S. Cl.............. 260/40 R; 161/170; 260/42.28; 260/836; 260/837 R; 260/861
[51] Int. Cl.²................... C08L 63/10; C08L 67/06
[58] Field of Search... 260/836, 40 R, 42.28, 837 R, 260/861

[56] References Cited
UNITED STATES PATENTS

| 3,227,665 | 1/1966 | Fourcade et al..................... 260/2.5 |
| 3,300,544 | 1/1967 | Parker ................................ 260/866 |
| 3,432,458 | 3/1969 | Kwan et al......................... 260/33.4 |
| 3,462,514 | 8/1969 | Kurkowski et al.................. 260/861 |
| 3,466,259 | 9/1969 | Jernigan.............................. 260/37 |
| 3,548,030 | 12/1970 | Jernigan............................. 260/836 |
| 3,631,224 | 12/1971 | Baum.................................. 260/861 |
| 3,632,667 | 1/1972 | Baum.................................. 260/861 |

*Primary Examiner*—Donald E. Czaja
*Assistant Examiner*—E. A. Nielsen

[57] ABSTRACT

Moldable, handleable ester-type resin-glass fiber compositions, are prepared by inducing partial vinyl polymerization of a mixture of a mono-olefin capable of being polymerized by free radical means and an unsaturated ester-type resin using benzoyl peroxide and controlled conditions. A mixture of styrene, an unsaturated polyester resin and glass fiber can be partially polymerized into a handleable, moldable intermediate composition adapted for mold curing to a solid, infusible reinforced product.

12 Claims, No Drawings

HANDLEABLE, MOLDABLE ESTER-TYPE RESIN COMPOSITIONS

This invention relates to a process for partially cross-linking a thermosetting ester-type resin composition in a fiber glass substrate to form a flexible material which can be readily handled and mold cured by heat to a solid infusible resin.

Unsaturated ester-type resins can be readily cross-linked through the sites of unsaturation by vinyl polymerization using a suitable cross-linking agent such as styrene to form a solid infusible resin. These polymers possess many properties including high strength and heat stability which make them useful in a variety of applications. The unsaturated ester-type resins include the unsaturated polyester-type resins and the vinyl ester-type resins. These vinyl ester resins are a type of unsaturated polyester resin although different from those resins which have conventionally been known in the resin art as unsaturated polyester resins. For this reason, the expression vinyl ester resin is used herein to identify this class of resins and unsaturated ester-type resin is used generically to describe both the conventional unsaturated polyester resins as well as the vinyl ester resins. The conventional unsaturated polyester resins are formed by the union of one or more diols with one or more diacidic materials of which at least one is unsaturated. A typical polyester resin is the condensation product of propylene glycol or ethylene glycol with a mixture of maleic anhydride and a mononuclear aromatic anhydride such as phthalic anhydride. Vinyl ester resins are made through an addition reaction of an epoxy resin with a carboxylated monomer such as acrylic acid.

It is possible to thicken the mixture of the unsaturated polyester resin and cross-linking agent by incorporating a minor amount of an alkaline earth metal oxide or related compound to the resin mixture and applying heat under controlled conditions. Thickening of the vinyl ester resin can also be accomplished with an alkaline earth metal oxide such as magnesium oxide provided that acid functionality is separately incorporated into the vinyl ester structure. Acid functionality is conventionally added for this purpose by reacting secondary hydroxyl groups contained in the vinyl ester resin with maleic anhydride to form the corresponding half ester. In this thickening process the alkaline earth metal compound enters into a weak chemical bonding with the acid groups of the ester-type resin without the concurrent occurrence of significant olefinic cross-linking. When a soft, sticky mixture of the unthickened resin, glass fibers and alkaline earth metal compound is deposited as a sheet between two plastic films, it can be thickened to form a flexible, moldable intermediate material, known as sheet molding compound. This sheet molding compound can then be mold cured by vinyl polymerization in matching molds by the application of heat to form a rigid, infusible fiber glass reinforced resin product.

This sheet molding compound has been generally made heretofore by forming a mixture of polyester resin, cross-linking agent and alkaline earth metal oxide in a feed reservoir from which it is fed to doctor blades and spread onto the inside surfaces of a pair of moving plastic films. Fiber glass floc is deposited in between the resin coated plastic film and is intermixed and wet with the resin by opposed kneading rollers. After this fiber glass-resin composite is kneaded, it is generally rolled up into sizable rolls. The composite in roll form must be allowed to set or thicken to the sheet molding compound for up to several days in specially designed, temperature and humidity controlled thickening rooms.

There are significant operational problems inherent in this procedure. Since thickening action takes place at room temperature, the resin mixture is continuously thickening in the feed reservoir. This requires a continual or frequent doctor blade adjustment to compensate for the increasing viscosity of the resin mixture. Moreover, this constant thickening of the resin results in a non-uniform product and frequently results in an incomplete wetting of the fiber glass, particularly during the latter stages of a batch. This leads to a substantial amount of non-specification material and resulting wastage.

By our invention we have eliminated many of these problems experienced in this prior art procedure currently used for making sheet molding compound from ester-type resins. In our procedure the resin is of constant uniform viscosity from the start of the operation until after the fiber glass is completely wetted with the resin since thickening does not take place prematurely. The resin-fiber glass composite is then thickened to the desired degree within a few minutes without requiring the specially designed thickening rooms heretofore used. This thickened intermediate can be mold cured immediately or it can be stored for a relatively long period of time, measured in days, at room temperature, without significant additional thickening. The advantages of the present invention include the ability to store the resin in the reservoir without thickening, uniform wetting of the fibers, the full reproducibility of the process for making material of constant specification, the ability to make a sheet molding compound of a predetermined viscosity, the elimination of specially designed thickening rooms, no need to store large rolls of material, no requirement for acid functionality in the vinyl ester resins, and the like. Our novel thickening procedure is also adapted to the preparation of prepreg for the production of reinforced laminates by thickening the ester-type resin which is incorporated in fiber glass cloth.

In our invention the ester-type resin formulation is thickened at controlled conditions of time and temperature using benzoyl peroxide as a free radical initiator to cause partial copolymerization or cross-linking to a semi-solid to solid intermediate but which does not contain sufficient gel to interfere with moldability. As long as the resin formulation is held below the activation temperature of the free radical initiator, such as at room temperature, no reaction occurs. However, when the resin formulation is heated above about 60° C., the benzoyl peroxide will decompose to form free radicals and vinyl polymerization will be initiated.

We have discovered that partial vinyl polymerization can be rapidly carried out to thicken the resin formulation to the desired moldable, handleable intermediate composition and then quickly stopped by cooling the thickened composition if the conditions are carefully controlled. These conditions include heating the resin composition to a temperature from about 75° C. to about 95° C., preferably from about 80° C. to about 90° C. for a few minutes until the desired thickening is obtained and then quickly cooling the thickened intermediate below 60° C., preferably to room temperature. Since the degree of thickening is dependent on the time and temperature involved as well as the resin composition used, the final viscosity or flexibility of the sheet molding compound can be controlled. Our invention is in part based on our discovery that the ester-type resin can be B-staged with a large excess of benzoyl peroxide over that required for partial copolymerization to form the intermediate composition and that this excess will remain in the cooled intermediate composition without significantly affecting it. This excess benzoyl peroxide is then available to initiate vinyl polymerization during the final cure.

Although the cross-linking agent such as styrene normally contains a polymerization inhibitor which is destroyed by the benzoyl peroxide when the formulation is heated up to thicken it, we have unexpectedly discovered that the large amount of unreacted styrene remaining in the intermediate compound does not significantly polymerize on standing in the absence of its polymerization inhibitor. Thus the composite can be stored at room temperature in its partially cured state for a substantial period of time before it hardens too much to flow in a heated mold.

The present invention represents a significant improvement over the procedure set out in U.S. Pat. No. 3,300,544. In this patent the polyester resin is partially cured by using a controlled proportion of free-radical initiator together with 1,4-naphthoquinone to inhibit or stop copolymerization after solidification has occurred. This procedure takes a much longer time, measured in hours, to polymerize to the solid, moldable intermediate composition in contrast with the minutes required by our process. Furthermore, this procedure described in the patent requires, when benzoyl peroxide is used both to prepare the intermediate material and to assist in the final cure, the mechanical incorporation of the additional benzoyl peroxide into the solid intermediate composition that is required for the final cure.

The novel procedure described herein is particularly useful in the preparation of sheet molding compound comprising relatively thin sheets of a partially cured mixture of resin and reinforcing fiber. This sheet molding compound is suitable for second stage curing in matching molds to produce fully cured products of minimum thickness and close tolerance and of intricate shape such as auto body parts and the like. The solution of the ester-type resin and the olefinically unsaturated hydrocarbon in association with the reinforcing material, such as glass fibers, is a soft, sticky mass. It is very difficult to handle and cannot be conveniently mold cured in one stage because of the handling difficulty and because the resin flows away from the reinforcing material during molding due to its fluidity.

In preparing these relatively thin sheets of partially cured resin-fiber mixture, it is convenient to initially deposit or form the sticky resin-fiber mixture on a surface upon which it can be partially cured according to our invention and from which the partially cured material can be readily removed for mold curing. The surface can be an endless moving belt upon which the resin-fiber mixture is first deposited, then successively conveyed through a heated oven for the first stage cure, and cooled and stripped from the supporting surface and cut to desired size. The sticky resin-fiber mixture can also be placed or formed between two flexible sheets such as plastic film to contain the resin and to permit ease in handling during the first stage polymerization. This backing film can then be conveniently removed at the time the partially cured material is placed in a heated mold for the final cure.

Partial polymerization of the olefinic double bonds of the olefinically unsaturated components as described herein converts the soft, sticky mixture into a flexible material which can be readily stripped from the supporting surface or containing sheets and easily handled, cut, shaped and molded. Furthermore, when this intermediate product is subjected to suitable molding pressure and temperature, the partially polymerized fiber-resin mixture flows uniformly and coherently into intricate mold sections and conforms to the mold prior to polymerization to the hard, infusible product. The sheet of intermediate product, particularly when it is relatively rigid as a result of the particular formulation used and not due to excessive gelation, can also be reduced to chips or particles and used in injection molding equipment.

In view of the highly exothermic nature of the vinyl polymerization (20–22 K.cal/mol), control of the temperature of the resin mixture in the vinyl polymerization stage within the specified temperature range of about 75° C. to about 95° C. can be suitably effected when the resin mixture is in relatively thin cross section, such as in film or sheet form rather than in bulk form. For example, the temperature of a sheet of the resin mixture can be controlled by direct heat conductive contact of one or both sides of the sheet with one or more metal surfaces under temperature control. As a further technique of temperature control, one or both sides of the sheet can be in heat conductive contact with a moving gaseous stream, preferably air, under controlled temperature to either heat or cool the sheet as desired. Radiant heating such as radiant heat lamps is also satisfactory. Thus, one side of the sheet undergoing vinyl polymerization can be in contact with the metal surface and the other side can be heated with a flowing gas stream or by radiant heating. The heating time required for producing a suitable intermediate product for any specific temperature and formulation can be quickly predetermined by a series of simple screening tests.

After the resin has been heated for the required time, it is quickly cooled. We have unexpectedly discovered that this cooling of the partially cross-linked resin below the activation temperature of the free radical initiator substantially stops any vinyl polymerization. Although the ability to heat and cool the resin composition involves a number of factors in addition to its thickness, superior temperature control is effected when the thickness of the resin mixture undergoing vinyl polymerization is not greater than about ten mm., preferably not greater than about five mm. and most preferably not greater than about three mm. The rate of vinyl polymerization is related to the rate of decomposition of the benzoyl peroxide which is directly related to the temperature.

In a preferred embodiment the soft, sticky resin-fiber mixture is composited in sheet form between two flexible sheets of a suitable film material, including plastic film such as polyethylene, aluminum foil and the like. The film material serves to contain the resin mixture and permits ease in handling until the first stage polymerization has been effected as described herein to produce the intermediate product. In another preferred embodiment the sheet molding compound is made in a continuous procedure by depositing the resin-fiber mixture on an endless metal, leather, woven, rubber, plastic, and the like, belt which is treated, if necessary, to make the surface non-adherent. The deposit on the moving belt is conveyed through an oven and heated to a suitable temperature between about 75° C. and about 95° C. for an appropriate time and then cooled. The resulting sheet molding compound is stripped from the belt and cut into suitable lengths.

In order to qualify as sheet molding compound both the resin and fibrous material in the intermediate product must be capable of flowing together in matched molds under heat and pressure to conform to intricate shapes. This requires that the intermediate resin must not be too thin to flow away from the fibers or so viscous that it cannot flow at the conditions of final cure. A satisfactory sheet molding compound requires that the resin flow freely in the mold carrying the fibers with it to produce a homogeneous final product.

One substantial advantage resulting from this invention is that sheet molding compound can be made more rapidly than by other procedures. For example, it can be made in times measured in seconds or a few minutes in contrast with the hours required by prior procedures. According to our process the thickened intermediate composition can be produced in a time as short as about 30 seconds or as long as about 20 minutes depending on the temperature and formulation utilized.

The unsaturated ester-type resins which can be used are the unsaturated polyester class of resins, the vinyl ester class of resins or the like. The unsaturated polyester resins are formed by the union of one or more diols with an unsaturated diacidic material or preferably with at least one unsaturated diacidic material and one saturated diacidic material. When the diacid forms the anhydride, the anhydride is preferred to the diacid. The art of preparing the unsaturated polyester backbone chain is well known. These unsaturated polyesters are commercially available either alone or dissolved in styrene.

A conventional cross-linked polyester resin is prepared from the union of propylene glycol or ethylene glycol and a combination of maleic anhydride and phthalic anhydride in the backbone chain with styrene serving as the cross-linker. More broadly the diol can be bisphenol A; 1,4-cyclohexanedimethanol, propylene glycol, ethylene glycol, and the like, or mixtures thereof.

The unsaturated diacidic monomer or its corresponding anhydride can be, in addition to the preferred maleic anhydride, maleic acid, fumaric acid, itaconic acid, chloromaleic anhydride, and the like, or mixtures thereof. The saturated diacidic monomer can be any suitable saturated diacid or anhydride including phthalic acid, phthalic anhydride, terephthalic acid, succinic acid, adipic acid, oxalic acid, isophthalic acid, the diacids of benzophenone, and the like, or mixtures thereof.

The diol moiety will react with the diacidic moiety in substantially equal molar amounts. However, it is advantageous to use a slight excess of the diol in the reaction mixture when the unsaturated polyester backbone chain is formed to insure more complete reaction. Since the unsaturated diacidic monomer introduces the unsaturation into the backbone chain through which the cross-linking is effected, the final properties of the cross-linked resin can, in part, be controlled by means of the ratio of the unsaturated to saturated diacidic monomer that is used. The most preferred unsaturated polyester resin is made with about equal molar amounts of the unsaturated and the saturated acidic monomers.

The vinyl ester resins do not require acid functionality in order to be thickened by our process, however, these modified vinyl ester resins are fully satisfactory. Although strictly speaking the vinyl ester resins are also polyester resins, it is convenient to distinguish between this group of vinyl ester resins and the more conventional unsaturated polyester resins, particularly due to the significant differences involved in preparing these two groups of resins. The vinyl ester resins can be formed by the reaction of any epoxide having an equivalent epoxy value greater than one and preferably at least about two with an ethylenically unsaturated monocarboxylic acid such as described in U.S. Pat. No. 3,367,992. The preparation of vinyl ester resins with carboxyl functionality incorporated into the molecule are described in U.S. Pat. No. 3,564,074. The polyepoxide can very suitably be a glycidyl polyether of a polyhydric phenol such as a diglycidyl either of bisphenol A. The ethylenically unsaturated monocarboxylic acid can very suitably be acrylic acid, methacrylic acid or the like. The reactants which can be successfully used in preparing vinyl ester resins are more fully set forth in these patents and are incorporated herein by reference.

The unsaturated ester-type resin whether of the unsaturated polyester-type resin or of the vinyl ester-type resin will also include an ethylenically unsaturated cross-linking component which is capable of being polymerized by free radical means. This cross-linking component is preferably a mononuclear vinyl aromatic compound such as styrene; 4-t.-butyl styrene; vinyl toluene; 2,5-dichlorostyrene; p-chloro- and bromostyrene; 4-methoxystyrene; 4-ethoxystyrene; p-nitrostyrene, and the like. This cross-linking component is generally used in an amount of about 1 to 3 mols for every mol of unsaturated monomer incorporated in the ester-type resin and preferably about 2 mols for every mol of unsaturated monomer in the ester-type resin.

Refrigeration of the sheet molding compound, although not essential, will reduce undesired changes in the sheet molding compound during storage. Generally when the first stage thickening is carried out as part of an integrated operation, the molding operation is carried out relatively soon in an adjacent unit. In this instance holding time presents no problem.

As pointed out, polymerization of the double bond is highly exothermic. In view of this, care must be exercised in order that the material does not heat high enough in the first stage polymerization to cause over thickening or gelation such that the material cannot be easily handled or molded. When the fiber-resin mixture has been laid down in thin sheets, the exothermic heat of reaction is more readily dissipated and the desired temperature maintained than when thick sheets are used. Polymerization can, in part, be controlled by correlating the time and temperature of the partial cure and the amount of the benzoyl peroxide. Generally we have found that from about 0.01 to about 5 parts by weight of the benzoyl peroxide per 100 parts of the resin constituents will effect vinyl polymerization and preferably about 1 to 3 parts is used. Although it is preferred to add sufficient benzoyl peroxide to effect both the initial cure and the final cure, it is also possible to add sufficient benzoyl peroxide only for the initial cure and rely on heat to effect the final cure.

It may be desirable to incorporate in the initial mixture a plasticizer or a plasticizing monomer which possesses the ability to enhance the flow characteristics during molding. Such plasticizing components include epoxidized vegetable oils such as epoxidized soy bean oil, di-2-ethylhexyl phthalate, dioctyl phthalate, dihexyl phthalate, di-isooctyl phthalate, polyethylene glycols such as those having a molecular weight between 600 and 1,000, methylbicyclo(2.2.1)heptene-2,3-dicarboxylic anhydride isomers, phenyl glycidyl ether, alkyl glycidyl ethers such as octyl and decyl glycidyl ethers and the like. Although refrigeration of the first stage product will reduce polymerization during storage, this alternative is not preferred. Therefore, when the first stage product is not used immediately, a plasticizer or a plasticizing monomer can be useful. Preferably the first stage polymerization is carried out as part of an integrated operation and the molding operation is carried out relatively soon in an adjacent unit.

The second stage curing completes the cross-linking reaction to produce a solid, infusible reinforced product. Final curing temperatures are suitably between about 80° C. and about 200 C., preferably between about 100° C. and about 170° C. For quick cures it is most preferred to use a curing temperature toward the upper end of the range. The curing time can be between about 30 seconds and eight hours depending of the curing temperature, the resin composition and the like, but generally is between about one to about 30 minutes. The presence of residual benzoyl peroxide in the intermediate product substantially enhances a rapid, complete final cure. Curing in stages, that is, at different temperatures, can be utilized, however, for simplicity and convenience one stage curing is preferred. Although pressure is not required for the second stage curing, it is usually involved when the intermediate product is mold cured and fortuitously the physical properties of the finally cured product are improved by curing under pressure. Pressures as high as 5,000 p.s.i. and higher are usable herein.

As previously indicated, the resin composition is preferably formed in sheets using a fibrous binder or reinforcing agent. Fiber glass is one of the preferred fibrous materials. It can be used in the form of a woven glass fabric or randomly distributed glass fibers. When chopped glass fibers or other randomly distributed fibers are used, they can suitably range from one-eighth inch (3 mm.) to 2 inches (50 mm.) in length or more and preferably from about one-fourth inch (6 mm.) to about 1 inch (25 mm.) in length. Other fibrous material can be used as the core or binder in the form of randomly distributed fibers, fluff, paper, woven fabric, etc. The binder can be a natural material such as cellulose, including sisal, hemp, cotton and linen, asbestos, and the like, or synthetic organic fibers such as nylon, polyester, polyolefin, and the like, or metallic thread and the like. Randomly distributed fibrous reinforcing material is preferred for use in sheet molding compound which requires flow during molding to conform to the mold while fibrous reinforcing material in sheet or fabric form is particularly useful in the preparation of pre-pregs for laminates. The resin can also be sprayed-up together with the reinforcing fiber preferably using a suitable spray-up gun with attached cutter for cutting the fiber.

Fiber glass in various forms is commercially available for resin-fiber glass compositions including fiber glass roving for use with spray-up equipment. A lubricant or finish is generally applied to the fiber glass filaments by the manufacturer. It is preferred that the fiber glass filaments comprising the fiber glass material used as the core or binder have a coating or finish which is reactive under the curing conditions with at least one of the resin forming components. The silane finishes are preferred because they are chemically bonded to the glass filaments and have free reactive groups available for reaction with the resin.

The resin compositions can contain constituents in addition to the monomers and core material such as pigments or dyes for coloring the finished product, plasticizers as mentioned, fillers and the like. The fillers provide the desirable function of reducing the cost of the final product without significantly reducing the physical properties. Suitable filler material includes powdered calcium carbonate, clay, sands, powdered metals such as aluminum and iron, metal oxides such as iron oxide, alumina, and the like, powdered silica, wood flour, walnut shell flour, and the like. The filler is preferably inert in the composition, that is, it should not significantly react with any of the reactants or catalyze a reaction involving the reactants. Other additives which can be used are a suitable mold release agent or a material such as poly(methyl methacrylate) or finely ground polyethylene to impart a low profile, that is, a smooth surface, to the finally cured product.

The following examples are set out to illustrate the novel process and compositions of the invention and to provide a better understanding of their details and advantages.

Room temperature, as used herein, means a temperature between about 20° C. and about 25° C. The cup mold referred to in the following examples is described in ASTM D731-57. It is designed to measure the molding index of stiff flow thermosetting plastics. The cup mold provides a very useful means for determining the ability of the resin-fiber mixture to flow in a mold as a mixture without segregation of the resin and fiber and for determining the effect on moldability by varying the formulation. Also the cup mold is very useful for determining the batch-to-batch uniformity of identical formulations.

The following commercially available materials were used in the experiments. Paraplex P-43 and Paraplex P-340 are unsaturated polyester resins prepared from phthalic anhydride, ethylene-propylene glycol and maleic anhydride and dissolved in styrene. Paraplex-543 and Paraplex-681 are poly(methyl methacrylate) resins dissolved in styrene which are designed to improve the surface of the cured polyester resin. The Paraplex materials were obtained from Rohm and Haas Company, Philadelphia, Pa. Selectron 5899-A is an unsaturated polyester resin of PPG Industries, Inc. of Pittsburgh, Pa. prepared from isophthalic anhydride, ethylene-propylene glycol and maleic anhydride and also dissolved in styrene. Epocryl E-11-D-50 is a vinyl ester resin prepared from methacrylic acid and diglycidyl ethers of bisphenol-A in 50 percent styrene obtained from Shell Chemical Company, New York City, N.Y. Atlas Chemical Industries, Inc. of Wilmington, Del. supplied the Atlac 382-2, a bisphenol-A fumarate polyester resin. The mold release agent used in the examples was Mold Wiz 18-36, a commercial product sold by Axel Plastics Research Laboratories, Inc., of Long Island City, N.Y.

Heating and temperature control of the sheet molding compound in the following examples was accomplished by the use of opposing metal platens under minor pressure to serve as a heat source and heat sink. The maintenance of the constant desired temperature was verified by a thermocouple embedded in the center of representative examples. The gel content of the intermediate product was determined by extraction of the solubles in a Soxhlet extractor using methyl ethyl ketone as the solvent. The cup molding was evaluated on an overall consideration of the following criteria, the flow of the material in the mold, the release from the mold, the uniformity of the molded product and the general appearance of the molded product.

EXAMPLE 1

A soft, sticky composition was prepared by manually mixing 100 grams of Paraplex P-43, 1 gram of benxoyl peroxide, 2 grams of the mold release agent, 100 grams of powdered calcium carbonate and 100 grams of ¼ inch (6.4 mm.) glass fibers in a polyethylene bag. The mixture was then spread out on a sheet of aluminum foil to a thickness of about 3 mm. and covered with a second sheet of aluminum foil. Partial cure was effected at 80° C. for 5 minutes followed by cooling to room temperature. The intermediate product was nontacky and flexible and was considered to be a good intermediate product. This intermediate product was cured at 127° C. for 5 minutes in the cup mold. The molding was evaluated to be excellent.

The experiment was repeated using a partial cure at 80° C. for 4 minutes. The intermediate product was sticky and was considered to be unsatisfactory.

EXAMPLE 2

A formulation identical to that of Example 1 was prepared except that 5 grams of powdered polyethylene were added. A first portion was partially cured at 80°C. for 5 minutes. The intermediate product was a flexible but tacky solid. The final cure in the cup mold at 127° C. for 5 minutes was evaluated to be excellent.

A second portion was partially cured at 80° C. for 6 minutes. The intermediate product was only slightly tacky but was somewhat stiffer than desired. The final cure at 127° C. for 5 minutes was also evaluated to be excellent.

A third portion was partially cured at 80° C. for 7 minutes. The intermediate was not tacky but was considered to be too stiff. The final cure at 127° C. for 5 minutes was evaluated as poor.

EXAMPLE 3

The formulation of Example 1 was repeated including a partial cure at 80° C. for 5 minutes. One portion was immediately analyzed for gel content by solvent extraction in a Soxhlet extractor using methyl ethyl ketone, a second portion after standing for three hours was analyzed for gel content in the same manner, a third after standing for 24 hours and a fourth after standing three weeks. The gel contents determined in this manner were 29.6, 29.1, 28.0 and 26.1 percent, respectively.

EXAMPLE 4

A formulation identical to that of Example 1 was spread out on an aluminum foil to an average thickness of about 3 mm. and wad covered with a second sheet of aluminum foil. This composite was then cut into several portions. A first portion was partially cured at 80° C. for 3 minutes, a second portion was partially cured at 80° C. for 3½ minutes and a third portion was partially cured at 80° C. for 4 minutes. The first portion was not satisfactory, the second was satisfactory with some stiffness and some tackiness, while the third portion was considered to be a satisfactorily B-staged product. By analysis following extraction the second portion was determined to have 15.2 percent gel and the third portion 28.5 percent gel.

EXAMPLE 5

A resin composition was made by mixing 582 grams of Paraplex P-43, 232 grams of styrene, 8.2 grams of benzoyl peroxide, 16.4 grams of the mold release agent and 814 grams of powdered calcium carbonate filler. The resulting mixture was a readily flowable liquid which was creamy in consistency. The filled resin composition was sprayed up onto a sheet of 18 inch by three foot aluminum foil together with about 25 mm. long chopped fiber glass to an overall thickness of about 5 mm. using a conventional spray-up gun with attached roving chopper. The sprayed-up composition was a viscous, sticky mass. It was determined by analysis to have an average composition of about 35 percent fiber glass.

Different portions from this sprayed-up sheet were partially cured at 80° C. for 5 minutes and then several representative samples from these portions were placed in the cup mold and cured at 127° C. for 5 minutes. The molding was considered to be good to excellent according to the described criteria.

EXAMPLE 6

A resin composition was prepared by mixing 62.4 grams of Paraplex P-340, 41.6 grams of Paraplex P-543, 1 gram of benzoyl peroxide, 2 grams of the internal mold release agent, 104 grams of powdered calcium carbonate filler and 90 grams of 6.4 mm. glass fibers in a plastic bag and forming into a 3 mm. thick composite with aluminum foil as described in Example 1. This composite was cut into four portions which were subjected to different conditions of B-staging. All were partially cured at 80° C. but for 5, 9, 10 and 11 minutes, respectively. The first intermediate product was unsatisfactory, the second was barely satisfactory with some tackiness, the third was satisfactory and the fourth portion was superior. The latter three portions analyzed 14.8, 23.8 and 32.5 gel content, respectively.

EXAMPLE 7

The composite of Example 6 was duplicated except that Paraplex P-681 was substituted in the same amount for the Paraplex P-543. Separate portions were partially cured at 80° C. for 8, 9 and 10 minutes, respectively. The first partial cure was not satisfactory, the second portion was adequate although slightly tacky and the third portion exhibited good sheet molding compound properties. Analysis of the second and third portions after partial cure showed a gel content of 17.9 and 26.1 percent, respectively.

EXAMPLE 8

A resin formulation was prepared by mixing 1,453 grams of Paraplex P-340, 817 grams of Paraplex P-543, 21.8 grams of benzoyl peroxide, 43.7 grams of the mold release agent and 2,270 grams of the powdered calcium carbonate filler. A part of this formulation was sprayed up with glass fiber in the manner as described in Example 5. The total spray-up weighed about 1,900 grams. Analysis of a portion showed that the glass content was 33.6 percent. Another portion was partially cured at 80° C. for ten minutes and cooled to a suitable sheet molding compound. It was determined by analysis to have a gel content of 13.7 percent.

EXAMPLE 9

A resin formulation ready for partial cure was prepared as described in Example 1, except that 100 grams of Selectron 5899-A were used in place of the Paraplex P-43. When a portion was heated to 80° C. for 9 minutes, a good quality sheet molding compound was produced. When a portion of this sheet molding compound was cup molded at 127° C. for 5 minutes, the result was evaluated to be excellent.

EXAMPLE 10

A resin formulation ready for partial cure was prepared as described in Example 1 except that 100 grams of Epocryl E-11-S-50 were used in place of the Paraplex P-43. A portion was B-staged at 80° for 10 minutes to produce a good quality sheet molding compound. A portion of this sheet molding compound was cured in the cup mold at 127° C. for 5 minutes. The molding was determined to be excellent based on the described criteria.

EXAMPLE 11

A resin formulation ready for partial cure was prepared as described in Example 1 except that 100 grams of Atlac 382-2 was used in place of the Paraplex P-43. A portion was B-staged at 90° C. for 5 minutes to produce a good quality sheet molding compound. A portion of this sheet molding compound was cured in the cup at 127° C. for 5 minutes and the result was also excellent.

It is to be understood that the above disclosure is by way of specific example and that numerous modifications and variations are available to those of ordinary skill in the art without departing from the true spirit and scope of our invention.

We claim:

1. A method of preparing a thermosettable, moldable composition which comprises C.

forming a liquid solution of a resin mixture consisting essentially of an unsaturated polyester or vinyl ester resin, an olefinically unsaturated monomer containing as its only functional groups at least one olefinic double bond capable of polymerization by free radical means, and benzoyl peroxide, wherein said unsaturated polyester resin is the reaction product of at least one diol and at least one unsaturated dicarboxylic acid or unsaturated dicarboxylic anhydride and said vinyl ester resin is the reaction product of an epoxide having an epoxy equivalent value greater than one with an ethylenically unsaturated monocarboxylic acid;

preparing a composite of said solution and a fibrous substrate;

partially copolymerizing said resin mixture through said olefinic double bonds of said unsaturated polyester or vinyl ester resin and said olefinically unsaturated monomer by free radical means by heating said composite to a temperature between about 75° C. and about 95° C. to thicken said composite to a thermosettable, moldable composition comprising a homogeneous mixture of unsaturated polyester or vinyl ester resin, olefinically unsaturated monomer, copolymer get and fibrous substrate; and cooling said composite below the copolymerization temperature of said resin mixture following said partial vinyl polymerization.

2. A method in accordance with claim 1 in which said fibrous substrate is fiber glass.

3. A method in accordance with claim 1 in which the fibrous substrate is chopped glass fibers.

4. A method in accordance with claim 1 in which the said temperature is between about 80° C. and about 90° C.

5. A method in accordance with claim 1 in which the composite is quickly heated to the copolymerization temperature and is quickly cooled below the copolymerization temperature following said partial vinyl polymerization.

6. A method in accordance with claim 1 in which the olefinically unsaturated monomer is a mononuclear vinyl aromatic compound.

7. A method in accordance with claim 6 in which the unsaturated polyester resin is prepared from ethylene glycol, propylene glycol or mixtures thereof, maleic anhydride and a mononuclear aromatic anhydride and the olefinically unsaturated monomer is styrene.

8. A method in accordance with claim 1 in which said vinyl ester resin is prepared from an epoxy resin having a vicinal epoxide functionality greater than one and an $\alpha,\beta$-unsaturated monocarboxylic acid and the olefinically unsaturated monomer is a mononuclear vinyl aromatic compound.

9. A method in accordance with claim 8 in which the vinyl ester resin is prepared from acrylic acid, methacrylic acid or mixtures thereof and diglycidyl ether of bisphenol A and the olefinically unsaturated monomer is styrene.

10. A method in accordance with claim 1 in which the thermosettable, moldable composition is formed in a thickness no greater than about 10 millimeters.

11. A method in accordance with claim 1 in which the thermosettable, moldable composition is formed in a thickness no greater than about 5 millimeters.

12. A method in accordance with claim 1 in which the thermosettable, moldable composition is formed in a thickness no greater than about 3 millimeters.

* * * * *

UNITED STATES PATENT OFFICE
CERTIFICATE OF CORRECTION

PATENT NO. : 3,922,247
DATED : November 25, 1975
INVENTOR(S) : Stanley M. Hazen and William J. Heilman It is certified that error appears in the above-identified patent and that said Letters Patent are hereby corrected as shown below:

Column 5, line 19, "made more" should read --made much more--.
Column 7, line 27, "depending of" should read --depending on--.
Column 8, line 57, "E-11-D-50" should read --E-11-S-50--.
Column 9, line 15, "benxoyl" should read --benzoyl--.
Column 9, line 64, "wad" should read --was--.
Column 11, line 20, "80°" should read --80° C.--.
Column 11, line 43, claim 1, "C" should be deleted.
Column 12, line 12, claim 1, "copolymer get" should read
    --copolymer gel--.
Column 12, line 44, claim 9, "and diglycidyl" should read
    --and a diglycidyl--.

Signed and Sealed this

*thirtieth* Day of *March 1976*

[SEAL]

Attest:

RUTH C. MASON
*Attesting Officer*

C. MARSHALL DANN
*Commissioner of Patents and Trademarks*